3,459,212
Patented Aug. 5, 1969

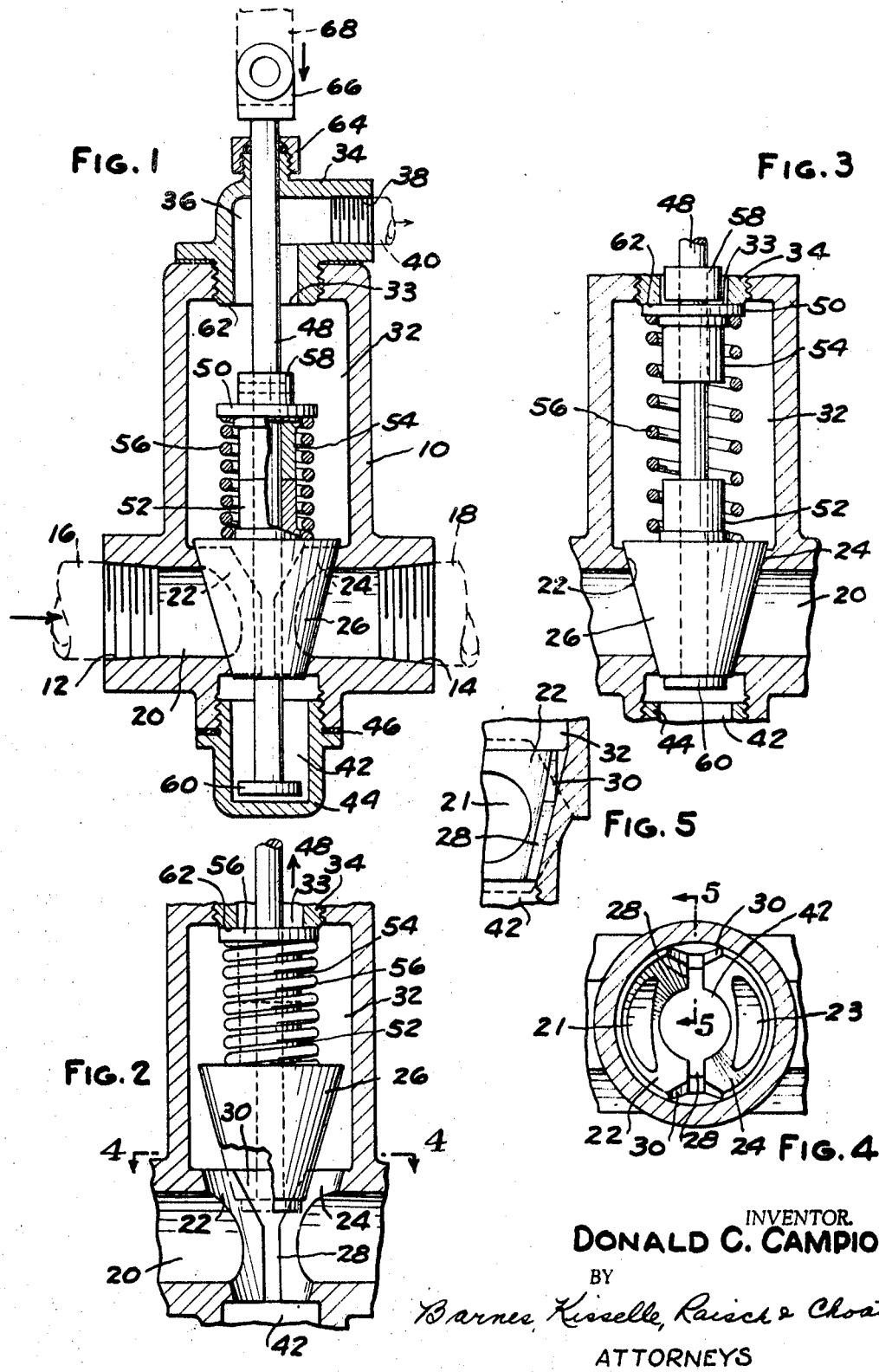

3,459,212
VENTED FLUID VALVE
Donald C. Campion, Sr., 1312 W. Hayward Ave.,
Phoenix, Ariz. 85021
Filed May 15, 1967, Ser. No. 638,405
Int. Cl. F16k 23/00
U.S. Cl. 137—312                    12 Claims

ABSTRACT OF THE DISCLOSURE

A vented valve having an inlet port, an outlet port and a vent port. A valve member controls these ports such that when the inlet and outlet ports are open to flow the vent port is closed and when the inlet and outlet ports are closed the vent port is open so that any leakage past the inlet port exhausts through the vent port.

---

This invention is related to valves and more particularly to a vented valve for controlling the flow of any fluid and especially suited for use in controlling the flow of gaseous or liquid fuel to a fuel burning device.

The valve of this invention generally comprises a valve body having an inlet port, an outlet port and a vent port. These ports are controlled by valves which are arranged such that when flow through the valve body is open between the inlet and outlet ports, the valve controlling the vent port is closed and when the inlet and outlet ports are closed, the valve controlling the vent port is open so that any leakage past the inlet port exhausts freely through the vent port.

In fuel burning devices, it is necessary to provide a valve in the conduit leading from the fuel source to the burner to control the flow of fuel to the burner. One of the problems in connection with such arrangements is that it is practically impossible to make a valve which will completely shut off the fuel flow over an extended period of time. The inability to produce such a valve is due not only to the wear that takes place between the valve member and its seat over an extended period of time, but also because of the fine abrasive particles which in practice invariably flow with most any gas or liquid fuel and which abrasive particles tend to mar the surfaces of the valve member and valve seat so that eventually, even the best of such valves have a tendency to leak. When this occurs, a small amount of fuel, whether it be liquid or gas, seeps through the valve and normally, this fuel will seep into the gas burning device through piping system and thereby create a serious danger of explosion.

It is an object of this invention to provide a valve arrangement for fluids, and particularly for fuel, that is designed such that when the valve is closed, any leakage that occurs will be directed to a vent passageway in the valve rather than downstream of the valve.

Other features and advantages of the valve arrangement of this invention will become apparent from the following description and drawing, in which:

FIG. 1 is a vertical sectional view of a valve arrangement embodying the present invention, the valve being shown in the closed position.

FIG. 2 is a fragmentary view similar to FIG. 1 and showing the valve in the open position.

FIG. 3 is a fragmentary sectional view similar to FIG. 2 and showing the valve components in the positions they assume when the valve is being actuated from the closed to the open position or vice versa.

FIG. 4 is a sectional view along the line 4—4 in FIG. 2 of the valve body.

FIG. 5 is a sectional view along the line 5—5 in FIG. 4.

The valve of the present invention includes a valve body 10 having an inlet port 12 and an outlet port 14.

These ports can be threaded as indicated for connection with an inlet conduit 16 and an outlet conduit 18. In the case of a fuel valve, inlet conduit 16 might extend from a source of fuel and outlet conduit 18 might extend to a fuel burning device such as a heater. Ports 12 and 14 are interconnected by a fluid passageway 20 which is interrupted between its ends by a pair of axially opposed valve seats 22, 24. Valve seats 22, 24 define axially opposed ports 21, 23 in passageway 20. Valve seats 22, 24 are formed in body 10 and are shaped such that the passageway 20 is adapted to be closed by a valve member 26. In the illustrated embodiment valve member 26 is in the form of a conical plug valve although the invention is applicable to other types of valves, gate valves, for example. Valve seats 22, 24 in effect form a concially tapered cross bore in passageway 20. Laterally, at each side of passageway 20 and between seats 22, 24, valve body 10 is fashioned with a groove 28. Each groove 28 has a diverging throat portion 30 at its upper end by means of which grooves 28 communicate with a generally cylindrical chamber 32 in the valve body. A fitting 34 threaded into the upper end of the valve body 10 has a passageway 36 therein which opens at one end into chamber 32 as by a port 33 and which is fashioned at its other end with a threaded port 38, hereinafter referred to as the vent port, to which a vent conduit 40 may be connected. Vent conduit 40 is adapted to open into atmosphere at a point remote from the valve. The lower ends of grooves 28 communicate with a chamber 42 beneath valve seats 22, 24. Chamber 42 is defined by a cap 44 threaded into the valve body 10 and sealed thereto by a gasket 46.

Valve plug 26 has a central bore by means of which it is slidably arranged on a valve operating stem 48. A disc valve 50 is also slidably arranged on stem 48. Valve plug 26 is formed with an axially extended bushing portion 52 and valve member 50 is likewise formed with a bushing portion 54. A coil compression spring 56 surrounds bushing portions 52, 54 and urges the valve members 26 and 50 axially away from each other on stem 48. The extent of upward movement of valve member 50 on stem 48 is limited by a bushing 58 fixed to stem 48 and the extent of downward movement of valve member 26 on stem 48 is limited by an enlargement 60 at the lower end of stem 48. Valve member 50 is adapted in one position of stem 48 to close against a seat 62 at port 33. Valve stem 48 extends upwardly through the opening defined by valve seat 62 and outwardly of the valve body through a threaded lug or fitting 34 sealed by a packing gland 64. The upper end of stem 48 is connected to a valve operating clevis 66 which is in turn connected to a suitable actuator 68 which may be operated by any suitable means such as a solenoid.

In FIG. 1, the valve is illustrated in the closed condition. In this condition of the valve, valve stem 48 has been shifted downwardly to a position wherein valve plug 26 is seated on seats 22, 24, bushing portions 52, 54 are in abutting relation and bushing 58 is bearing downwardly on valve member 50. Thus, in this condition of the valve, there is a direct positive connection between valve stem 48 and valve member 26 and the force with which valve member 26 bears against valve seats 22, 24 controlling inlet and outlet ports 12 and 14, respectively, corresponds directly with the downward force applied to stem 48. Now, assuming that fuel under pressure is directed to inlet port 12, it is conceivable and quite probable, if the valve has been used over an extended period of time, that there will be at least a slight leakage of fuel around valve member 26. With the present arrangement, the fuel that leaks past seat 22 and around valve member 26 does not have a tendency to flow out of the valve through outlet port 14. This is true because as the fuel leaks past seat 22, it flows into communication with groove 28 and its enlarged throat 30. In turn, groove 28 and throat 30 communicate with chamber 32 which opens to atmosphere through the fitting 34. Thus, there is little or no restriction to the flow of fuel out through the vent passageway. On the other hand, in order for the fuel to flow through outlet port 14, it is necessary for the fuel to flow through the very restricted leakage path between valve member 26 and seat 24. In the event that the fluid control by the valve is a liquid, it is preferable to invert valve body 10 such that the liquid which leaks past valve seat 22 will gravitate into chamber 32 and drain out of the valve through the vent port 38.

The valve is open by retracting the step 48 upwardly. Initial upward movement of stem 48 merely enables spring 56 to expand and thus lift disc valve 50. The abutment 58 and the lug 60 on stem 48 are spaced apart axially such that upon upward movement of stem 48, disc valve 50 engages and seals with valve seat 62 at port 33 before abutment 60 engages the lower end of valve member 26. Thus, as shown in FIG. 3, the vent passageway in the valve body is closed at port 33 by disc valve 50 before valve member 26 is retracted from its seats 22, 24. The valve is fully opened by retracting stem 48 upwardly to a position where valve member 26 is lifted sufficiently to compress spring 56 and cause bushing portion 52 to abut bushing portion 54 and urge disc valve 50 tightly against its seat 62. The fully open position of the valve is illustrated in FIG. 2. It will be appreciated that when the valve is fully open and it is desired to close it by shifting stem 48 downwardly, the expansion of spring 56 will cause valve member 26 to engage its seats 22, 24 and thereby close passageway 20 before valve disc 50 moves downwardly out of engagement with its seat 62. Thus, in opening and closing, the valve fluid passageway 20 is never in open communication with vent port 38.

I claim:

1. A fluid valve having a body provided with a fluid passageway therein, a pair of valve ports in said fluid passageway and spaced axially thereof, valve means cooperating with said ports to control the flow of fluid through said passageway, a vent port on said body, a vent passageway in said body extending from said vent port and communicating with said fluid passageway at the portion thereof intermediate said valve ports, a valve member for opening and closing said vent passageway and means for operating said valve member and valve means such that the vent passageway is closed whenever the fluid passageway is opened and the vent passageway is opened whenever the fluid passageway is closed whereby when said fluid passageway is closed any fluid which leaks past the upstream valve ports flow into direct communication with said vent passageway.

2. A valve as called for in claim 1 wherein said valve means comprises a single valve member controlling both valve ports in said fluid passageway.

3. The combination called for in claim 2 wherein said valve ports include axially opposed valve seats in said fluid passageway and said valve means is disposed between said valve seats.

4. The combination called for in claim 1 wherein said operating means interconnect said valve means and said valve member.

5. The combination called for in claim 4 wherein said operating means includes a lost motion connection between said valve member and said valve means such that said valve means closes before the valve member opens and the valve member closes before the valve means opens.

6. The combination called for in claim 1 wherein said operating means comprises a valve stem on which said valve member and said valve means are mounted, said valve means being slidably supported on said valve stem and means urging said valve means on said valve stem in a direction to close the valve ports in said fluid passageway.

7. The combination called for in claim 2 wherein said valve operating means comprises a valve actuator which is reciprocable in a path extending transversely of the axis of said fluid passageway, said valve means and said valve member being operatively connected with said valve actuator and being adapted to control their respective passageways in response to movement of said valve actuator in a direction transversely of the axis of the fluid passageway.

8. The combination called for in claim 7 wherein said valve means are slidable axially on said actuator, said actuator when shifted axially in one direction acting to shift the valve member to closed position and the valve means to open position and when shifted axially in the opposite direction serving to shift the valve member to open position and the valve means to closed position.

9. The combination called for in claim 8 including spring means biasing said valve means to a valve closing position and abutment means on the actuator engageable with said valve means for shifting the valve means to open position after a predetermined initial stroke of the actuator in a direction for shifting the valve member to closed position.

10. The combination called for in claim 8 including spring means biasing said valve member and valve means toward closed position and abutment means on said actuator adapted to engage and shift said valve means and valve member toward open position in response to axial movement of the actuator in opposite directions.

11. The combination called for in claim 10 wherein the valve means and the valve member are both slidably mounted on the valve actuator.

12. The combination called for in claim 11 including abutment means on the valve member and valve means which are adapted to interengage and provide a driving connection between the valve actuator and the valve means when the actuator is shifted to a position opening the valve member.

References Cited

UNITED STATES PATENTS

| 1,483,631 | 2/1924 | Forbes | 137—312 |
| 1,672,223 | 6/1928 | Larsen | 137—312 X |
| 2,156,498 | 5/1939 | Hinrichs | 137—312 |

HENRY J. KLINKSIEK, Primary Examiner

M. O. STURM, Assistant Examiner

U.S. Cl. X.R.

137—609, 612